(12) United States Patent
North et al.

(10) Patent No.: US 8,954,645 B2
(45) Date of Patent: Feb. 10, 2015

(54) STORAGE WRITES IN A MIRRORED VIRTUAL MACHINE SYSTEM

(75) Inventors: Geraint North, Manchester (GB); Adam McNeeney, Cambridgeshire (GB); Bruce G. Mealey, Austin, TX (US); Brian C. Twichell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 13/358,067

(22) Filed: Jan. 25, 2012

(65) Prior Publication Data
US 2012/0191908 A1 Jul. 26, 2012

(30) Foreign Application Priority Data
Jan. 25, 2011 (EP) .................................... 11152061

(51) Int. Cl.
G06F 21/00 (2013.01)
G06F 11/20 (2006.01)
G06F 11/14 (2006.01)

(52) U.S. Cl.
CPC ........ *G06F 11/2046* (2013.01); *G06F 11/2097* (2013.01); *G06F 11/1484* (2013.01); *G06F 11/203* (2013.01); *G06F 11/2038* (2013.01)
USPC .............................................. 711/6; 711/162

(58) Field of Classification Search
CPC combination set(s) only.
See application file for complete search history.

(56) References Cited

U.S. PATENT DOCUMENTS

| | | | |
|---|---|---|---|
| 7,603,392 B2 | 10/2009 | Ben-Yehuda et al. | |
| 2008/0201479 A1* | 8/2008 | Husain et al. | 709/227 |
| 2009/0319738 A1* | 12/2009 | Ben-Yehuda et al. | 711/162 |
| 2010/0070678 A1 | 3/2010 | Zhang et al. | |
| 2010/0107158 A1 | 4/2010 | Chen et al. | |
| 2010/0122052 A1 | 5/2010 | Waldspurger et al. | |

OTHER PUBLICATIONS

Ta Shma, P., et al "Virtual machine time travel using continuous data protection and checkpointing" in ACM SIGOPS Operating Systems Review vol. 42 No. 1 (Jan. 2008) p. 127-134 http://www.research.ibm.com/haifa/projects/storage/cdp/papers/systor07-4-ta-shma.pdf.

* cited by examiner

*Primary Examiner* — Charles Rones
*Assistant Examiner* — Han Doan
(74) *Attorney, Agent, or Firm* — Yudell Isidore PLLC; Steven L. Bennett

(57) ABSTRACT

Performing storage writes in a mirrored virtual machine system by receiving a state of a primary virtual machine during execution of an application, wherein the primary virtual machine runs on a first physical machine and a secondary virtual machine runs on a second physical machine, wherein the state is captured by checkpointing, and the primary virtual machine is configured to write data to a first block and concurrently write the data to a write buffer on the secondary virtual machine. The method also includes storing a copy of data within a second block to a rollback buffer for the secondary virtual machine, in response to identifying a checkpoint in the application, merging the rollback buffer with the write buffer, in response to detecting a failover, writing a copy of the rollback buffer to the disk storage, and continuing execution on the secondary virtual machine from the last checkpoint.

18 Claims, 8 Drawing Sheets

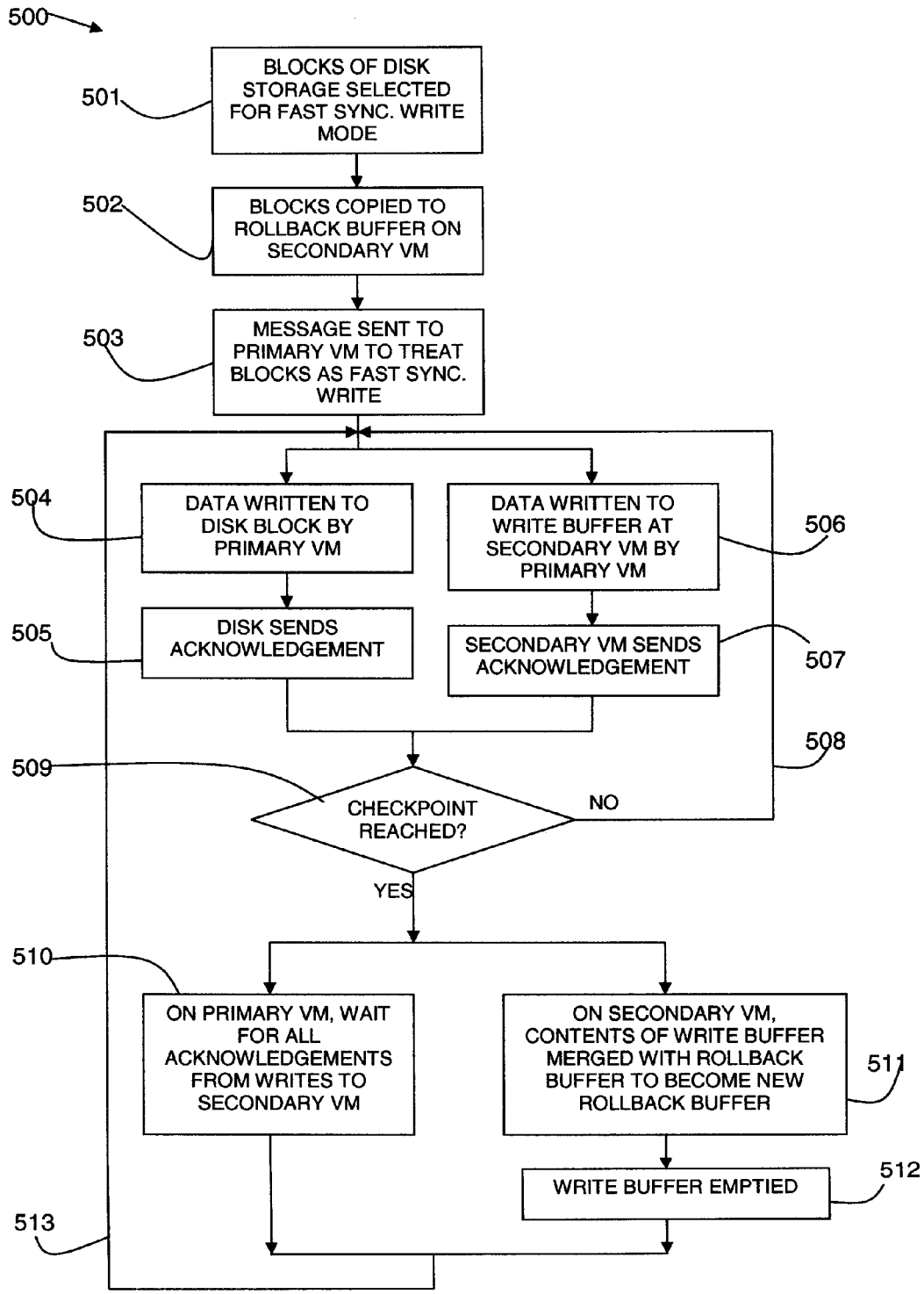

STORAGE WRITES IN A MIRRORED VIRTUAL MACHINE SYSTEM

TECHNICAL FIELD

This invention relates to the field of checkpoint-based high-availability solutions in mirrored virtual machines. In particular, the invention relates to storage writes in mirrored virtual machine checkpointing.

DESCRIPTION OF THE RELATED ART

A virtual machine mirror is a way of running a virtual machine (VM) such that if a hardware failure occurs, it can be instantly restarted on a second physical machine. The state is exchanged between a primary virtual machine on a first physical machine and a secondary virtual machine on a second physical machine. This is done by means of checkpointing the primary virtual machine by capturing the state of the first virtual machine and transferring it to the secondary virtual machine. The aim is to reduce downtime caused by hardware failure in a computing system.

These checkpoint-based systems, are built on top of existing virtual machine hypervisors and extend the hypervisor's functionality by capturing modifications to a primary virtual machine's memory state and transferring it over to a secondary computing system at very frequent intervals (for example, every 25 ms).

The core idea is that, should the primary computing system fail, the secondary computing system has a virtual machine in almost the precise same state ready for immediate execution. When this secondary virtual machine is activated, it starts to receive and transmit network packets and perform disk I/O just as the virtual machine did when it ran on the primary computing system. The effect from the outside world is of a minor (milliseconds) discontinuation of activity, similar to if the network connection to the virtual machine had been briefly disconnected and reconnected.

Because the virtual machines are not kept in complete lockstep, but only synchronize on these frequent checkpoints, writes by the primary virtual machine to disk have to be handled specially. This is because, to ensure correctness, the secondary virtual machine must not only resume from a valid checkpoint of the primary virtual machine's state, but disk storage must also be in precisely the same state. In effect, the secondary virtual machine is the primary virtual machine "rolled back" some number of milliseconds, to the last checkpoint.

The simplest way to tackle this problem is the "checkpoint on write" approach to storage modification. Under this scheme, the primary virtual machine issues every write request as normal, but that write does not complete until a checkpoint has been taken. This means that in the case of failure on the primary, it can resume from the previous checkpoint on the secondary, knowing that the disk cannot have been modified since that checkpoint. Once a checkpoint has been made to the secondary virtual machine, the writes can be released to disk. If the primary computing system is halfway through actually performing the writes when it fails, the secondary virtual machine can be resumed from the previous checkpoint, but some of the outstanding write commands will return an error, causing the operating system to retry them.

BRIEF SUMMARY

Aspects of the described invention provide a method, a system, and a computer program product for fast synchronous write in a virtual machine environment. The method includes receiving a state of a primary virtual machine during execution of an application, wherein the primary virtual machine runs on a first physical machine and a secondary virtual machine runs on a second physical machine, wherein the state is captured by checkpointing, and the primary virtual machine is configured to write data to a first block and concurrently write the data to a write buffer on the secondary virtual machine. The method also includes storing a copy of data within a second block to a rollback buffer for the secondary virtual machine, in response to identifying a checkpoint in the application, merging the rollback buffer with the write buffer, in response to detecting a failover, writing a copy of the rollback buffer to the disk storage, and continuing execution on the secondary virtual machine from the last checkpoint.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein:

FIGS. 5A-5B depict flow charts illustrating the method for providing a mirrored virtual machine system on two physical machines.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1:
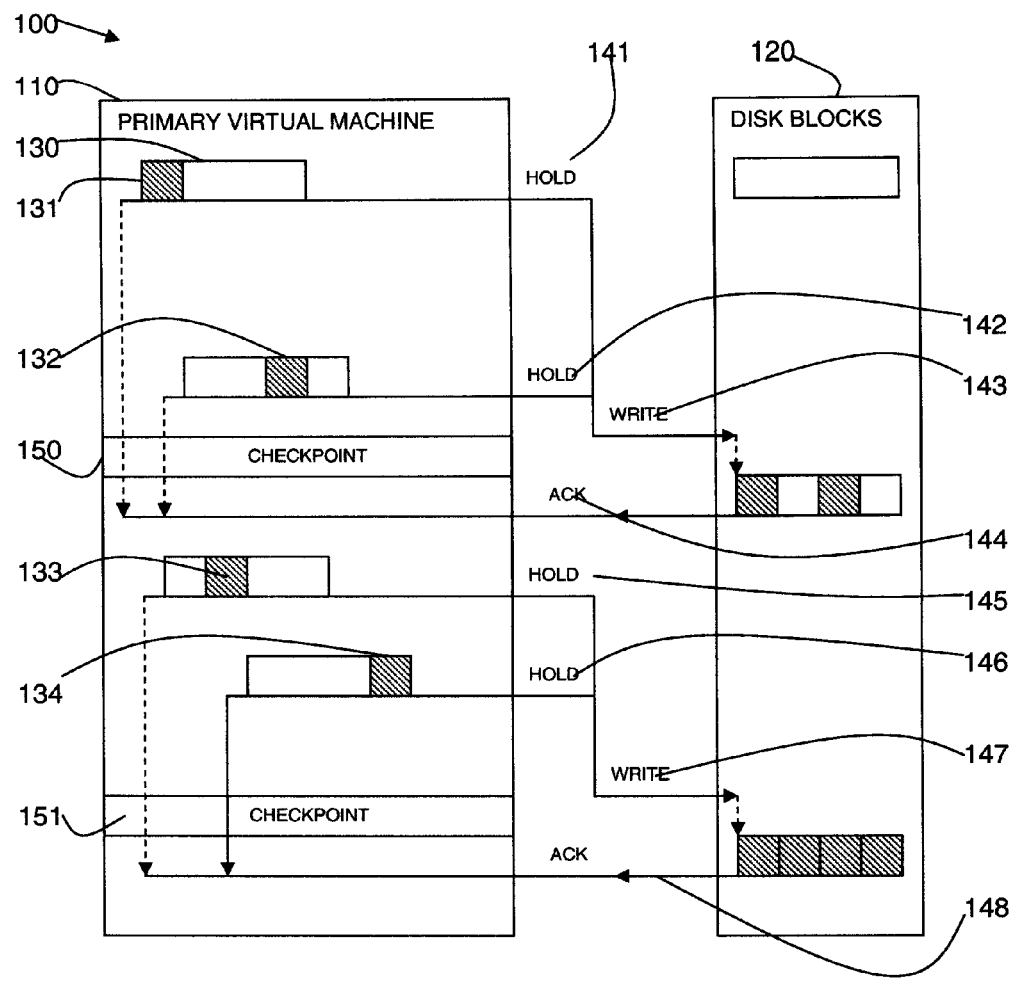
FIG. 1 provides a block diagram representation of virtual machine, according to one embodiment.

Referring to FIG. 1, a diagrammatic illustration 100 of checkpoint-on-write as known in the prior art is provided in which the progression of writes through time is shown progressing vertically down the illustration 100. A primary virtual machine 110 writes to disk blocks 120. Changed blocks are shown by diagonally hashed shading.

In this illustration 100, a first block 131 of a sequence of blocks 130 is modified by the primary virtual machine 110, followed by a second block 132. The modifications to the first and second blocks 131, 132 are held 141, 142 and written 143 to the disk blocks 120 at the next checkpoint 150. An acknowledgement 144 is sent by the disk blocks 120 to confirm the writes.

After the checkpoint 150, a further third block 133 is modified, followed by a fourth block 134. The modifications to the third and fourth blocks 133, 134 are held 145, 146 and written 147 to the disk blocks 120 at the next checkpoint 151. An acknowledgement 148 is sent by the disk blocks 120 to confirm the writes.

The problem with this approach is the additional latency that it adds to write operations. A write operation does not return successfully until the next checkpoint, and so in a system where checkpoints are taken every 25 ms, this would add an average of 12.5 ms to every write. It is common, especially in databases and file systems that use transaction logs for the time taken to fully complete a write to be very important. Therefore, there is a need in the art to address the aforementioned problem.

A method and system are described for a complementary means of checkpointing disk writes in a mirrored virtual machine system that does not add any additional latency to writes. It performs well when access behaviours tend to be sequential writes to a volume. The described method is referred to as fast synchronous write.

Figure 2:
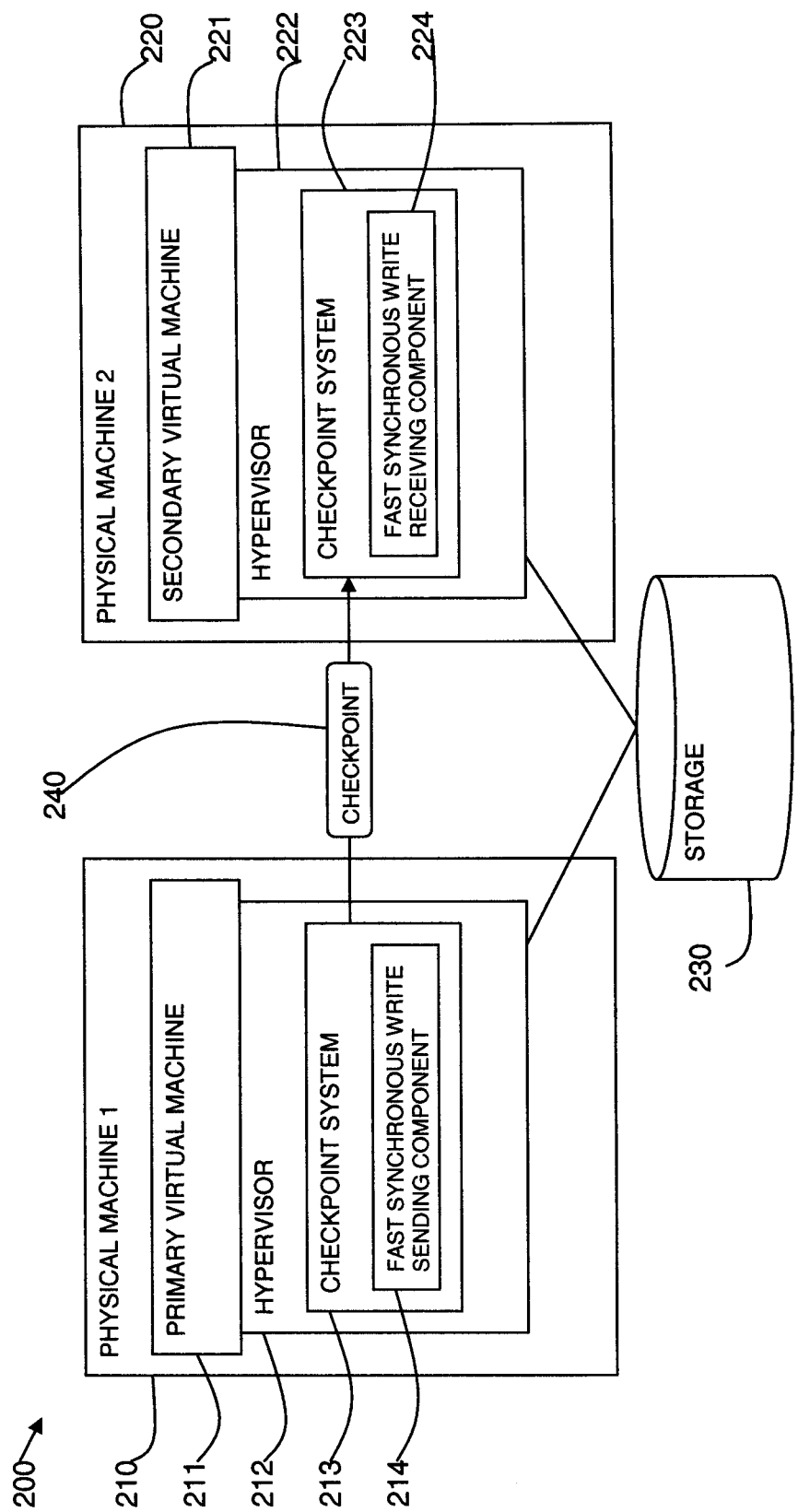
FIG. 2 provides a block diagram representation of an example computing environment with mirrored virtual machines, according to one embodiment.

Referring to FIG. 2, a block diagram shows an example embodiment of a mirrored virtual machine system 200 in which the described storage write system and method may be implemented.

A primary virtual machine 211 runs on a first physical machine 210 which has a hypervisor 212 including input/output management of network packets and storage writes.

A secondary virtual machine 221 runs on a second physical machine 220 or a logical partition of the first physical machine 210. The secondary physical machine 220 also has a hypervisor 222.

A storage medium 230 is provided to which the primary virtual machine 211 and secondary virtual machine 221 makes storage writes.

The hypervisor 212 of the primary virtual machine 211 includes a checkpointing system 213 which communicates periodically with a checkpointing system 223 of the hypervisor 222 of the secondary virtual machine 221. The checkpointing system 213 of the primary virtual machine 211 captures modifications to a primary virtual machine's memory state and transfers it over to the checkpointing system 223 of the a secondary virtual machine 221 at very frequent intervals (for example, every 25 ms).

In the described system 200, a fast synchronous write sending component 214 is provided on the checkpointing system 213 of the primary virtual machine 211 with a corresponding fast synchronous write receiving component 224 provided on the checkpointing system 223 of the secondary virtual machine 221.

The fast synchronous write components 224, 223 provide a system for ensuring a correct view of storage is maintained in the event of a failover from the first primary virtual machine 211 to the secondary virtual machine 221. The fast synchronous write components 224, 223 are applied when access behaviours tend to be sequential writes to a volume of the storage medium 230. The fast synchronous write components 224, 223 provide an optimization in which a copy of designated blocks prior to modification are maintained by the secondary virtual machine 221 and copies of writes made to the blocks in the storage medium 230 by the primary virtual machine 211 are copied to the secondary virtual machine 221 and stored to enable it to update its back up of the blocks at checkpoints.

Figure 3:
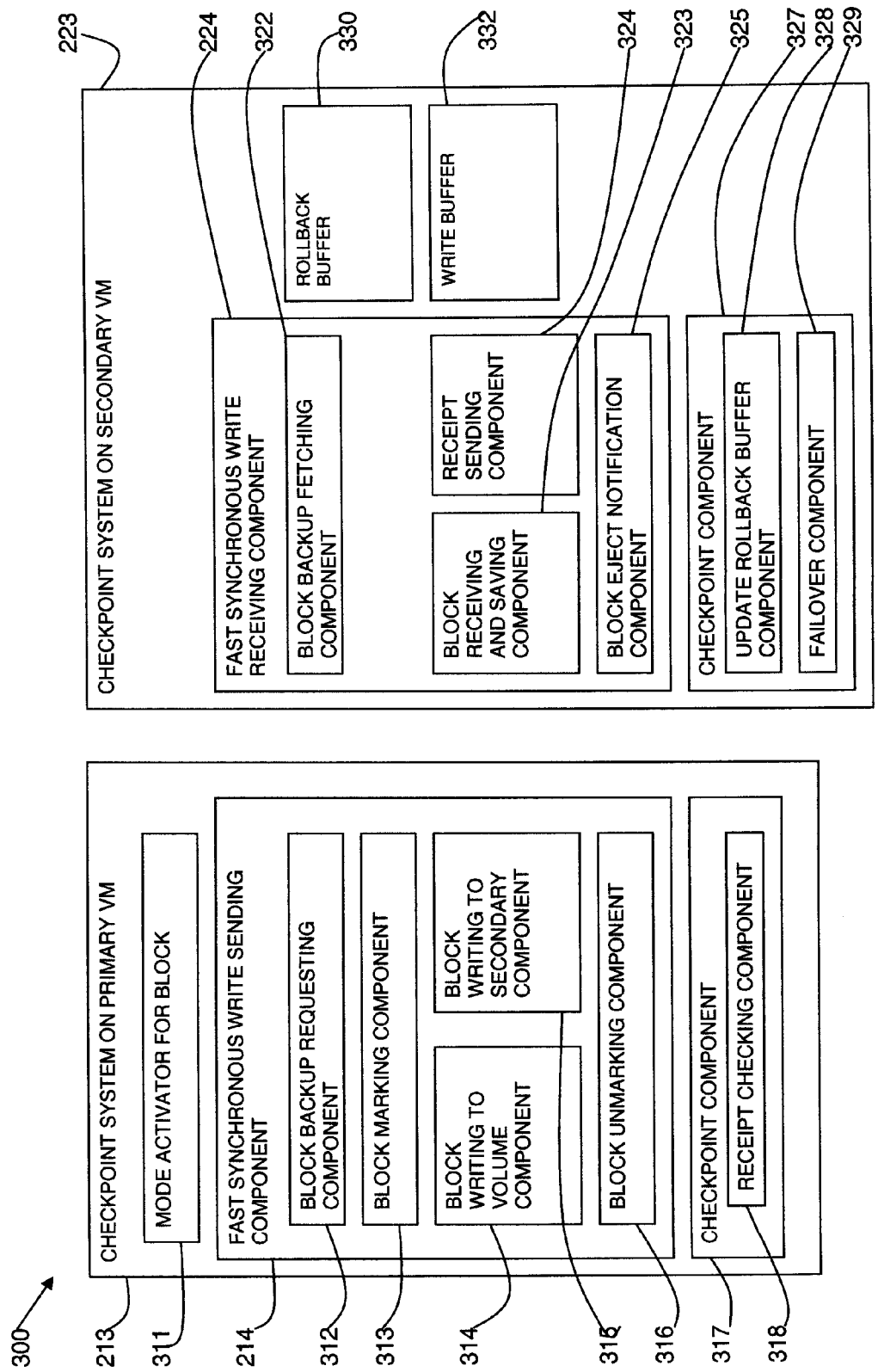
FIG. 3 provides a block diagram representation of example mirrored virtual machines, according to one embodiment.

Referring to FIG. 3, further details of the checkpoint systems 213, 223 of the primary and secondary virtual machines of FIG. 2 are shown.

The checkpoint system 213 of the primary virtual machine includes a mode activator for blocks 311 which determines when a fast synchronous write should be activated for blocks to be written to storage.

The described fast synchronous write performs well when access behaviours tend to be sequential writes to a volume. The mode activator 311 may take different forms including: (1) A user enabled activation in which a user may enable this feature for a specific volume. Good performance and disaster recovery practice suggests that logs, which are often very sensitive to synchronous write performance, should be placed on different volumes to the data, anyway. (2) An operating system activation in which an operating system enables this feature for specific blocks of disk where it sees synchronous sequential write behaviour holding up the progress of an application. (3) A heuristics activation within a hypervisor which detects and enable this mode when it considers it beneficial to do so.

The described system may be applied when multiple disk blocks are involved in writes. A disk block must be written in its entirety if any of the block is changed. Therefore, a multiple-block implementation is provided of the described fast synchronous write. Even if only one block is being modified, multiple sequential blocks are read onto the secondary virtual machine before the write is performed and acknowledged back to the system.

A fast synchronous write sending component 214 of the checkpoint system 213 of the primary virtual machine includes a block backup requesting component 312 for requesting that the fast synchronous write receiving component 224 of the checkpoint system 223 on the secondary virtual machine backs up the requested blocks. The fast synchronous write receiving component 224 has a block backup fetching component 322 which fetches the requested blocks from storage and stores them in a rollback buffer 330.

The fast synchronous write sending component 214 includes a block marking component 313 for marking blocks as using fast synchronous write.

The primary virtual machine writes one or more blocks to a volume of the storage medium, without waiting for the next checkpoint, using a block writing volume component 314. The primary virtual machine simultaneously writes a copy of the block to the secondary virtual machine using a block writing to secondary component 315. The fast synchronous write receiving component 224 includes a block receiving and saving component 323 which saves the write updates to a write buffer 332, this may be as deltas of writes. A receipt sending component 324 is provided to send a receipt of the write update back to the primary virtual machine.

The fast synchronous write receiving component 224 of the secondary virtual machine also includes a block eject notification component 325 for notifying the primary virtual machine when blocks should no longer use fast synchronous write. This may be if the writes are no longer sequential or if the rollback buffer 330 is full.

The fast synchronous write sending component 214 of the primary virtual machine includes a block unmarking component 316 for removing the fast synchronous mode from the blocks.

A checkpoint component 317 of the checkpoint system 213 of the primary virtual machine includes a receipt checking component 318 for checking if receipts of all the block writes have been received from the secondary virtual machine. A checkpoint component 327 of the checkpoint system 223 of the secondary virtual machine includes an update rollback buffer component 328 for updating the backup copy of the blocks in the rollback buffer 330 with the write updates from the write buffer 332. The checkpoint component 327 of the checkpoint system 223 of the secondary virtual machine also includes a failover component 329 for writing a copy of the rollback buffer 330 to disk storage at a failover.

Figure 4:
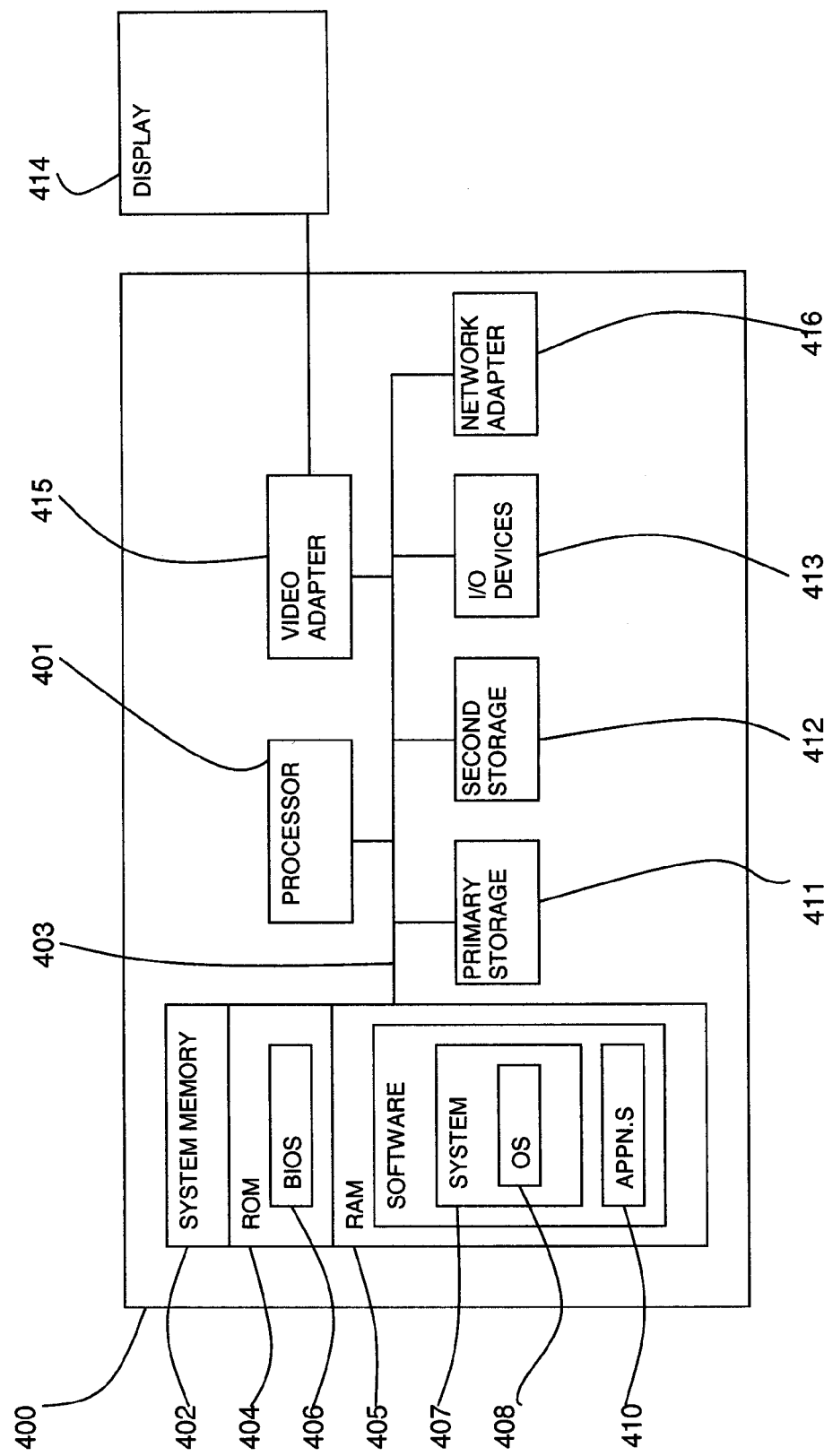
FIG. 4 provides a block diagram representation of an example computing environment within which the invention may be practiced.

Referring to FIG. 4, an exemplary system for implementing aspects of the invention includes a data processing system 400 suitable for storing and/or executing program code including at least one processor 401 coupled directly or indirectly to memory elements through a bus system 403. The memory elements can include local memory employed during actual execution of the program code, bulk storage, and cache memories which provide temporary storage of at least some program code in order to reduce the number of times code must be retrieved from bulk storage during execution.

The memory elements may include system memory 402 in the form of read only memory (ROM) 404 and random access memory (RAM) 405. A basic input/output system (BIOS) 406 may be stored in ROM 404. System software 407 may be stored in RAM 405 including operating system software 408. Software applications 410 may also be stored in RAM 405.

The system 400 may also include a primary storage means 411 such as a magnetic hard disk drive and secondary storage means 412 such as a magnetic disc drive and an optical disc drive. The drives and their associated computer-readable media provide non-volatile storage of computer-executable instructions, data structures, program modules and other data for the system 400. Software applications may be stored on the primary and secondary storage means 411, 412 as well as the system memory 402.

The computing system 400 may operate in a networked environment using logical connections to one or more remote computers via a network adapter 416.

Input/output devices 413 can be coupled to the system either directly or through intervening I/O controllers. A user may enter commands and information into the system 400 through input devices such as a keyboard, pointing device, or other input devices (for example, microphone, joy stick, game pad, satellite dish, scanner, or the like). Output devices may include speakers, printers, etc. A display device 414 is also connected to system bus 403 via an interface, such as video adapter 415.

Referring to FIG. 5A, a flow diagram 500 shows an embodiment of the described method. The method is provided in a mirrored virtual machine system running on two physical machines (or a partitioned physical machine). If a primary virtual machine hardware failure occurs, the secondary virtual machine starts from the last checkpoint. The state is exchanged between the primary and secondary virtual machines by checkpointing. In checkpointing, the state of the primary virtual machine is captured and transferred to the secondary virtual machine. The described method is concerned with ensuring that the view of the storage is correct if failover occurs.

When a write occurs to a disk block that has been marked as potentially benefiting from the fast synchronous write optimisation, the existing copy of the block is retained by the secondary virtual machine, and in the event of failure, the secondary virtual machine restores the disk to the state appropriate to the last checkpoint.

Blocks of disk storage are selected 501 as suitable for the fast synchronous write mode described herein. The blocks are copied 502 to a rollback buffer in the secondary virtual machine. Once the blocks have been backed up, the secondary virtual machine sends 503 a message to the primary virtual machine, telling it to treat those blocks in this new fast synchronous write mode until further notice.

New data is written 504 to a block on the disk by the primary virtual machine and the disk sends 505 an acknowledgement. In parallel, the new data is written 506 to a write buffer in the secondary virtual machine. Because the communication with the secondary virtual machine occurs in parallel to the write, there is no additional latency before the write can be acknowledged. As the secondary virtual machine receives these writes, it uses them to build up (along with the backup copy it read initially) a picture of how these blocks looked at the last checkpoint. The writes to the disk and to the secondary virtual machine are described as occurring in parallel; however, these may be one after the other but in quick succession.

The secondary virtual machine sends an acknowledgement 507 when the write is received, but the primary virtual machine can continue to run without waiting for this acknowledgement. It is only at the next checkpoint that all acknowledgements must have been received, thus confirming to the primary virtual machine that the secondary virtual machine is able to construct the correct rollback point for the disk block should a failure occur in the future.

Additional new data is written and the method loops 508 until a checkpoint is reached 509.

The primary virtual machine waits 510 for all the acknowledgments from the writes to the secondary virtual machine. In parallel, on the secondary virtual machine, the contents of the write buffer 511 is merged with the rollback buffer and becomes the new rollback buffer and the write buffer is emptied 512.

The method then continues when both steps 510 and 511 have completed with further writes from the primary virtual machine as shown by the method loop 513 until the next checkpoint is reached.

Figure 5B:
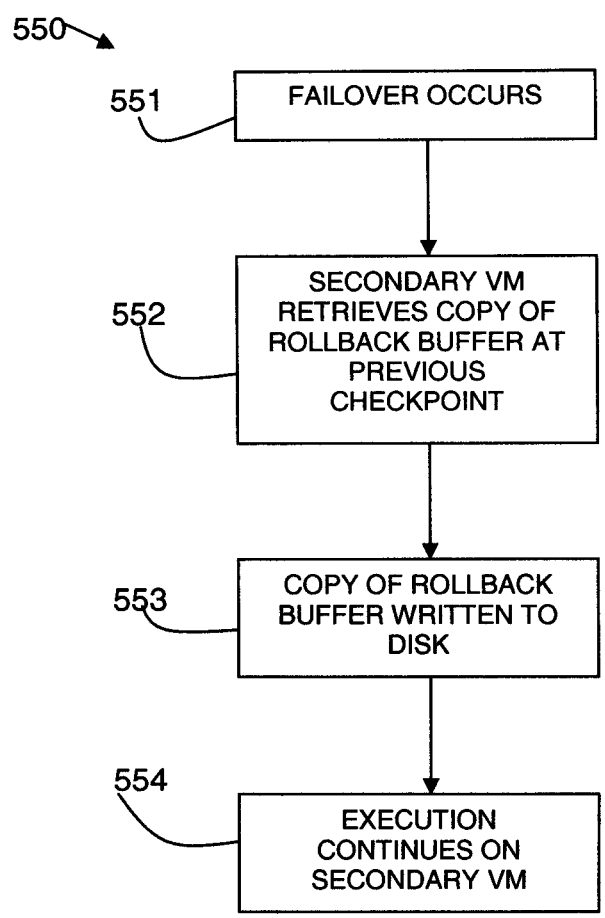

Referring to FIG. 5B, a flow diagram 550 shows an embodiment of the described method when a failover occurs. If a failover occurs 551, the secondary virtual machine retrieves 552 a copy of blocks as of the previous checkpoint. This copy is written 553 to disk restoring the disk to the image at the checkpoint. Execution continues 554 on the secondary virtual machine.

Figure 6A:
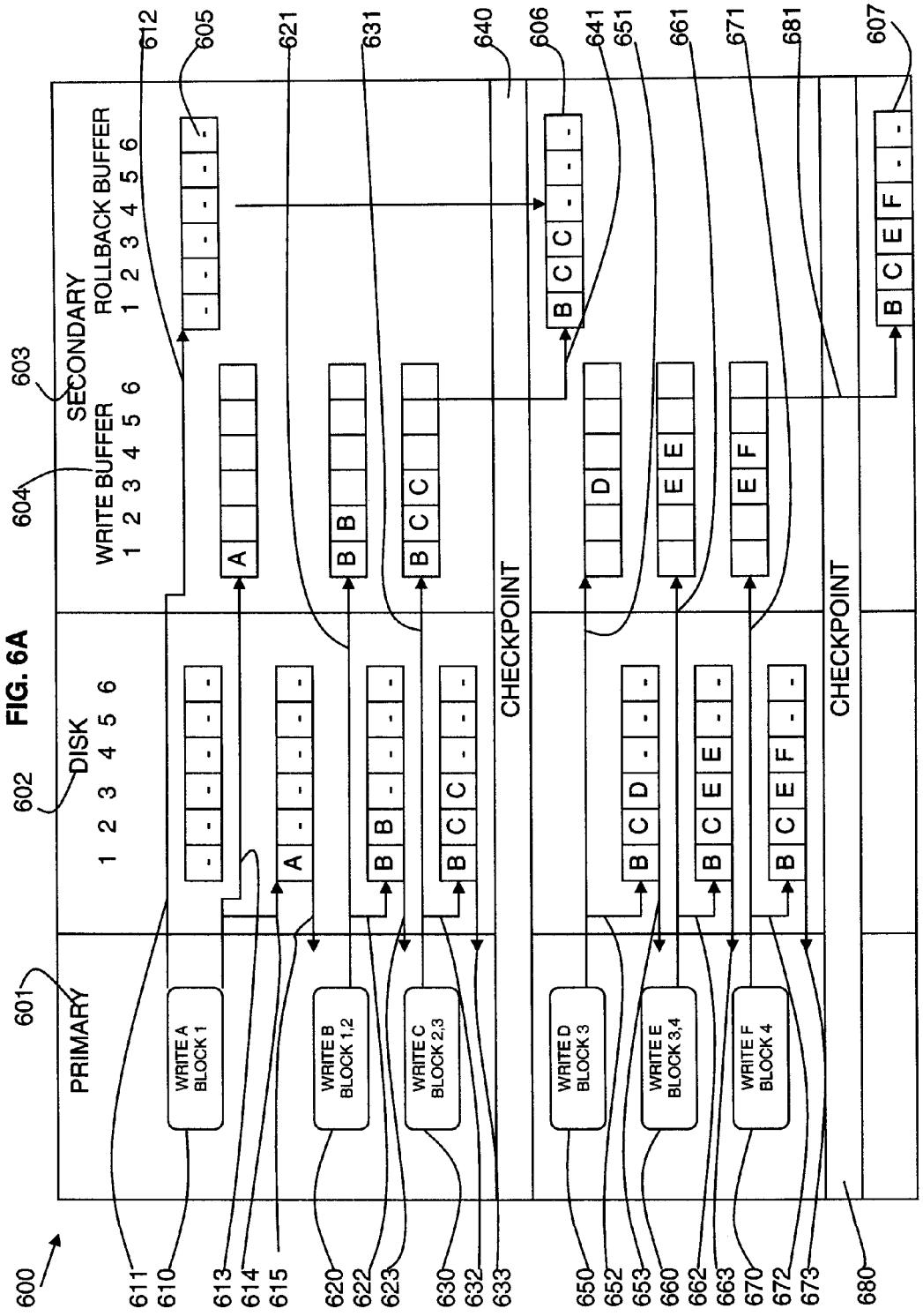
FIGS. 6A-6B depict schematic diagrams corresponding to the methods depicted in FIGS. 5A-5B.
Figure 6B:
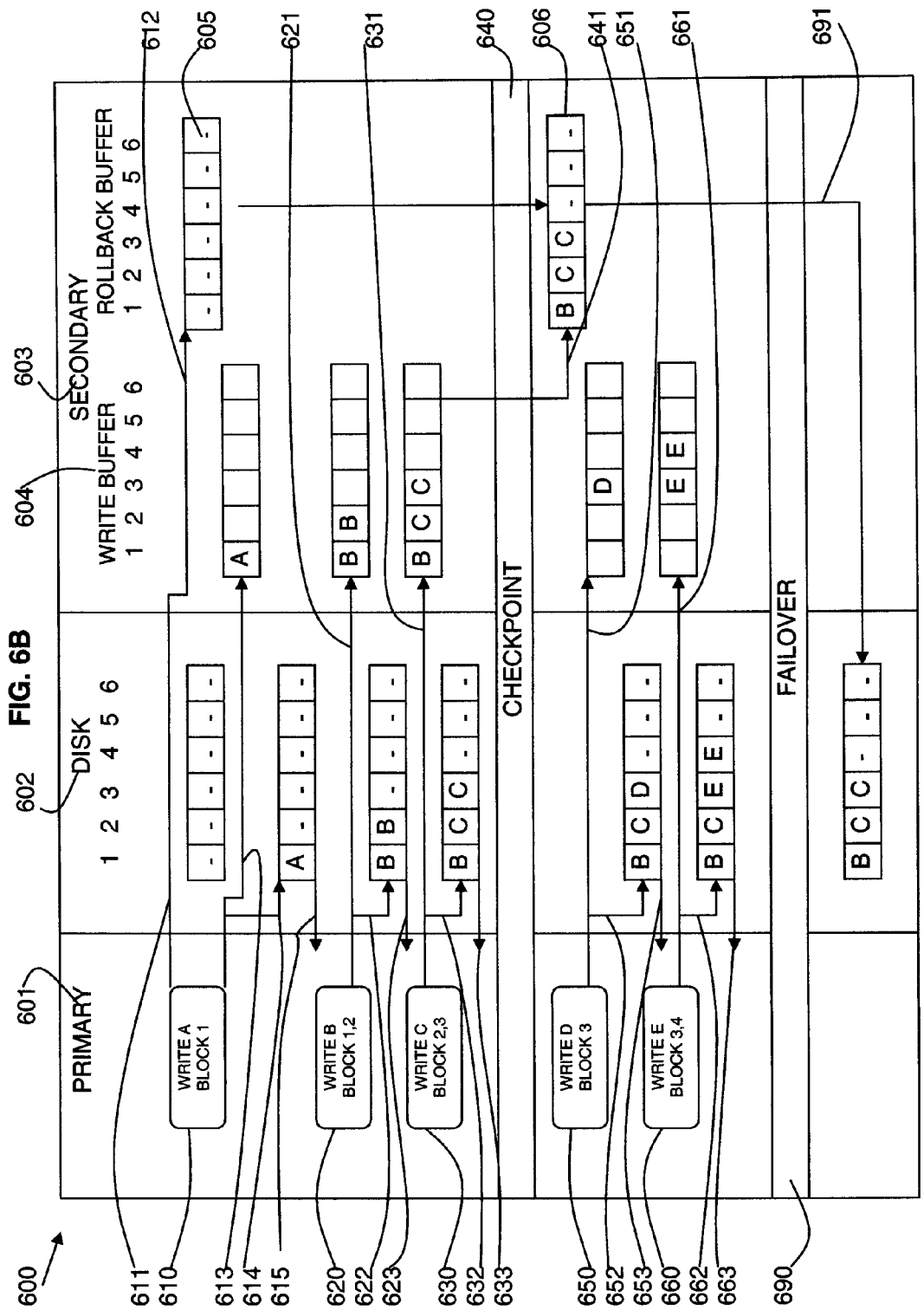

Referring to FIGS. 6A and 6B, detailed schematic diagrams 600, 650 show an embodiment of the described method with actions carried out between the primary virtual machine 601, the disk 602 and the secondary virtual machine 603. The secondary virtual machine 603 has a write buffer 604 and a rollback buffer 605.

The primary virtual machine 601 carries out a write A 610 of block 1. The write to the block triggers the activation of fast synchronous write and blocks 1-6 are placed 611 in fast synchronous write mode and copied 612 to a rollback buffer 605 in the secondary virtual machine 603. Even though only one block is being modified by the write operation, blocks 1-6 are read onto the secondary virtual machine 603 before the write is performed.

The new data is written 613 to the write buffer 604 of the secondary virtual machine 603 in parallel with the new data write 614 to disk 602. Acknowledgment 615 of the write 614 to disk is sent back to the primary virtual machine 601.

Subsequent write operations leading up to a checkpoint also update the disk and send new versions of the block to the write buffer 604 on the secondary virtual machine 603.

A write B 620 is carried out of blocks 1, 2. The new data is written 621 to the write buffer 604 of the secondary virtual machine 603 in parallel with the new data write 622 to disk 602. Acknowledgment 623 of the write 621 to disk is sent back to the primary virtual machine 601.

A write C 630 is carried out of blocks 2, 3. The new data is written 631 to the write buffer 604 of the secondary virtual machine 603 in parallel with the new data write 632 to disk 602. Acknowledgment 633 of the write 631 to disk is sent back to the primary virtual machine 601.

A checkpoint is carried out 640 and the contents of the write buffer 604 are merged 641 with the rollback buffer 605 of the secondary virtual machine 603 and becomes the new rollback buffer 606 and the write buffer 604 is cleared.

The method continues after the checkpoint 640 with a write D 650 carried out of block 3. The new data is written 651 to the cleared write buffer 604 of the secondary virtual machine 603 in parallel with the new data write 652 to disk 602. Acknowledgment 653 of the write 651 to disk is sent back to the primary virtual machine 601.

A write E 660 is carried out of blocks 3, 4. The new data is written 661 to the write buffer 604 of the secondary virtual machine 603 in parallel with the new data write 662 to disk 602. Acknowledgment 663 of the write 661 to disk is sent back to the primary virtual machine 601.

A write F 670 is carried out of block 4. The new data is written 671 to the write buffer 604 of the secondary virtual machine 603 in parallel with the new data write 672 to disk 602. Acknowledgment 673 of the write 671 to disk is sent back to the primary virtual machine 601.

A next checkpoint is carried out 680 and the contents of the write buffer 604 are merged 681 with the rollback buffer 606 of the secondary virtual machine 603 to become the new rollback buffer 607 and the write buffer is cleared.

Referring to FIG. 6B, the sequence of writes of FIG. 6A is shown with a failover 690 after write E 660. The secondary virtual machine 603 has a copy of the disk blocks at the previous checkpoint 640 in the rollback buffer 606. The secondary virtual machine 604 writes 691 the rollback buffer 606 to disk 602, thus restoring the disk image to the precise state at the checkpoint 640. The execution resumes on the secondary virtual machine 604.

Given that this feature is for sequential write behaviour, the mechanism would place a number of blocks into fast synchronous write mode in anticipation of receiving a sequence of writes from the primary virtual machine in the near future that covered these blocks.

The described method takes a backup copy of the blocks only once, when a block is first written to, and thus the additional latency associated with the backup is only incurred on the first write; with the secondary virtual machine reading-ahead on the basis of expecting sequential writes, even this happens very rarely. The transmission of writes to the secondary virtual machine allows it to maintain a rollback block across multiple checkpoints without having to re-read the block.

The secondary virtual machine must maintain a copy of each modified block, and update it with the writes sent across from the primary virtual machine, and these structures are maintained across multiple checkpoints; therefore, this method is not suited to general-purpose random-access to a volume. However, for sequential log writes to a volume, both the data structures containing these modified blocks and the write traffic as a percentage of overall I/O could be small.

If the secondary virtual machine needs to eject a block from its rollback data structures, either because the block is no longer being accessed sequentially, or because space in these data structures is required for other blocks, it must first notify the primary virtual machine that it intends to stop fast synchronous write for this "victim" block. On receipt of this message, the primary virtual machine should revert to the standard mechanism for performing disk writes on the victim block at the next checkpoint. At the next checkpoint, the data structures for the victim block on the secondary virtual machine are no longer required and can be used for a different block.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method for performing storage writes in a mirrored virtual machine system, the method comprising:

a secondary virtual machine receiving, during running of an application, a state of a primary virtual machine, wherein the primary virtual machine runs on a first physical machine and the secondary virtual machine runs on a second physical machine, wherein the state of the primary virtual machine is captured by checkpointing, and wherein the primary virtual machine is configured to write updates to data of a first block of disk storage and concurrently write the updates to the data to a write buffer on the secondary virtual machine;

storing an existing copy of the data to a rollback buffer for the secondary virtual machine;

in response to the primary virtual machine writing one or more updates to the first block, the secondary virtual machine simultaneously receiving, from the first virtual machine, a write to the write buffer that includes the one or more updates to the first block;

in response to the secondary virtual machine determining that one or more victim blocks are to be elected from the rollback buffer, the secondary virtual machine notifying the primary virtual machine of an end to the data writes to the write buffer for the one or more victim blocks of data, wherein in response to the primary virtual machine receiving the notification of the end to the data writes to the write buffer for the one or more victim blocks of data, the primary virtual machine reverts to standard disk writes for the one or more victim blocks at the next checkpoint;

in response to identifying a next checkpoint in the application:
    merging the data of the write buffer into the rollback buffer; and
    clearing the write buffer; and
in response to detecting a failover:
    writing a copy of the rollback buffer to the disk storage; and
    continuing execution of the application on the secondary virtual machine from a last checkpoint.

2. The method of claim 1, further comprising:
    selecting one or more blocks of data suitable for backing up the rollback buffer; and
    sequentially writing the rollback buffer to the selected one or more suitable blocks of data.

3. The method of claim 2, further comprising: receiving the selection of the one or more suitable blocks of data for a specific volume of the data storage.

4. The method of claim 2, wherein selecting the one or more suitable blocks of data is performed automatically in response to detecting the sequential writing of the one or more suitable blocks of data.

5. The method of claim 2, wherein selecting the one or more suitable blocks of data is triggered automatically based on heuristics within a hypervisor.

6. The method of claim 1, wherein the rollback buffer for the secondary virtual machine is maintained across multiple checkpoints.

7. The method of claim 1, further comprising:
    sending acknowledgments to the primary virtual machine of data writes sent to the write buffer, wherein the primary virtual machine receives all acknowledgements before the secondary virtual machine merges the write buffer with the rollback buffer at the next checkpoint, and wherein the primary virtual machine continues to run without waiting for the acknowledgments.

8. A computer program product, comprising:
    a non-transitory computer readable storage device; and
    executable computer program code, stored in the computer readable tangible storage device, to:
    receive, a state of a primary virtual machine at a secondary virtual machine during execution of an application, wherein the primary virtual machine runs on a first physical machine and the secondary virtual machine runs on a second physical machine, wherein the state of the primary virtual machine is captured by checkpointing, and wherein the primary virtual machine is configured to write updates to data of a first block of disk storage and concurrently write the updates to the data to a write buffer on the secondary virtual machine;
    store an existing copy of the data to a rollback buffer for the secondary virtual machine;
    in response to the primary virtual machine writing one or more updates to the first block, receive, from the first virtual machine, a write to the write buffer that includes the one or more updates to the first block;
    in response to the secondary virtual machine determining one or more victim blocks to be ejected from the rollback buffer, notify the primary virtual machine of an end to the data writes to the write buffer for the one or more victim blocks of data, wherein in response to the primary virtual machine receiving the notification of the end to the data writes to the write buffer for the one or more victim blocks of data, the primary virtual machine reverts to standard disk writes for the one or more victim blocks at the next checkpoint;
    in response to identifying a next checkpoint in the application:
    merge the data of the write buffer into the rollback buffer; and
    clear the write buffer; and
    in response to detecting a failover:
    write a copy of the rollback buffer to the disk storage; and
    continue execution of the application on the secondary virtual machine from a last checkpoint.

9. A data processing system, comprising:
    a computer processor;
    a non-transitory computer readable storage device; and
    computer program code, stored in the non-transitory computer readable tangible storage device, and executable by the computer processor to:
    receive, a state of a primary virtual machine at a secondary virtual machine during execution of an application, wherein the primary virtual machine runs on a first physical machine and the secondary virtual machine runs on a second physical machine, wherein the state of the primary virtual machine is captured by checkpointing, and wherein the primary virtual machine is configured to write updates to data of a first block of disk storage and concurrently write the updates to the data to a write buffer on the secondary virtual machine;
    store an existing copy of the data to a rollback buffer for the secondary virtual machine;
    in response to the primary virtual machine writing one or more updates to the first block, receive, from the first virtual machine, a write to the write buffer that includes the one or more updates to the first block;
    in response to the secondary virtual machine determining one or more victim blocks to be ejected from the rollback buffer, notify the primary virtual machine of an end to the data writes to the write buffer for the one or more victim blocks of data, wherein in response to the primary virtual machine receiving the notification of the end to the data writes to the write buffer for the one or more victim blocks of data, the primary virtual machine reverts to standard disk writes for the one or more victim blocks at the next checkpoint;
    in response to identifying a next checkpoint in the application:
    merge the data of the write buffer into the rollback buffer; and
    clear the write buffer; and
    in response to detecting a failover:
    write a copy of the rollback buffer to the disk storage; and
    continue execution of the application on the secondary virtual machine from a last checkpoint.

10. The data processing system of claim 9, further comprising computer code to:
    select one or more blocks of data suitable for backing up the rollback buffer; and
    sequentially write the rollback buffer to the selected one or more suitable blocks of data.

11. The data processing system of claim 10, further comprising computer code to: receive the selection of the one or more suitable blocks of data for a specific volume of the data storage.

12. The data processing system of claim 10, wherein selecting the one or more suitable blocks of date is performed automatically in response to detecting the sequential writing of the one or more suitable blocks of data.

13. The data processing system of claim 10, wherein selecting the one or more suitable blocks of data is triggered automatically based on heuristics within a hypervisor.

14. The data processing system of claim 9, wherein the rollback buffer for the secondary virtual machine is maintained across multiple checkpoints.

15. The data processing system of claim 9, further comprising computer code to:
   send acknowledgments to the primary virtual machine of data writes sent to the write buffer, wherein the primary virtual machine receives all acknowledgements before the secondary virtual machine merges the write buffer with the rollback buffer at the next checkpoint, and wherein the primary virtual machine continues to run without waiting for the acknowledgments.

16. The computer program product of claim 8, further comprising computer program code executable by the computer processor to:
   select one or more blocks of data suitable for backing up the rollback buffer; and
   sequentially write the rollback buffer to the selected one or more suitable blocks of data.

17. The computer program product of claim 16, further comprising computer program code to:
   receive the selection of the one or more suitable blocks of data for a specific volume of the data storage;
   wherein selecting the one or more suitable blocks of data is performed automatically in response to one or more of (a) detecting the sequential writing of the one or more suitable blocks of data and (b) heuristics within a hypervisor;
   wherein the rollback buffer for the secondary virtual machine is maintained across multiple checkpoints.

18. The computer program product of claim 16, further comprising computer program code to:
   send acknowledgments to the primary virtual machine of data writes sent to the write buffer, wherein the primary virtual machine receives all acknowledgements before the secondary virtual machine merges the write buffer with the rollback buffer at the next checkpoint, and wherein the primary virtual machine continues to run without waiting for the acknowledgments; and
   in response to the secondary virtual machine determining one or more victim blocks to be ejected from the rollback buffer, notify the primary virtual machine of an end to the data writes to the write buffer for the one or more victim blocks of data, wherein in response to the primary virtual machine receiving the notification of the end to the data writes to the write buffer for the one or more victim blocks of data, the primary virtual machine reverts to standard disk writes for the one or more victim blocks at the next checkpoint.

* * * * *